US 6,709,704 B2

(12) United States Patent
Yamaguchi et al.

(10) Patent No.: US 6,709,704 B2
(45) Date of Patent: Mar. 23, 2004

(54) METHOD OF SEALING CELLS OF CERAMIC HONEYCOMB BODY

(75) Inventors: Satoru Yamaguchi, Anjyo (JP); Hitoshi Kanmura, Mie-pref. (JP); Noboru Ogino, Okazaki (JP); Takahiro Kondou, Takahama (JP); Kouji Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 99 days.

(21) Appl. No.: 09/996,996

(22) Filed: Nov. 30, 2001

(65) Prior Publication Data

US 2002/0066982 A1 Jun. 6, 2002

(30) Foreign Application Priority Data

Dec. 1, 2000 (JP) ........................................ 2000-367218

(51) Int. Cl.⁷ ................................................ B05D 1/32
(52) U.S. Cl. ...................... 427/259; 427/261; 427/282; 427/402; 427/443.2
(58) Field of Search ................................. 427/259, 261, 427/282, 402, 443.2

(56) References Cited

FOREIGN PATENT DOCUMENTS

JP  9-25180  1/1997

*Primary Examiner*—Bernard Pianalto
(74) *Attorney, Agent, or Firm*—Nixon & Vanderhye P.C.

(57) ABSTRACT

A method of sealing the cells of a ceramic honeycomb body (5) and a cell sealing material (1) are disclosed which can suppress the deformation and dissolution of the portions of the ceramic honeycomb body dipped in the cell sealing material. An end surface (50) of the ceramic honeycomb body (5), with the portions of the end surface (50) not to be sealed covered with a masking material, is dipped in the cell sealing material (1) thereby to seal the cells in a predetermined part of the end surface. The cell sealing material (1) is composed of ceramic particles and an assistant for fluidizing the ceramic particles. The assistant has the property of not substantially redissolving a binder contained in the ceramic honeycomb body.

3 Claims, 5 Drawing Sheets

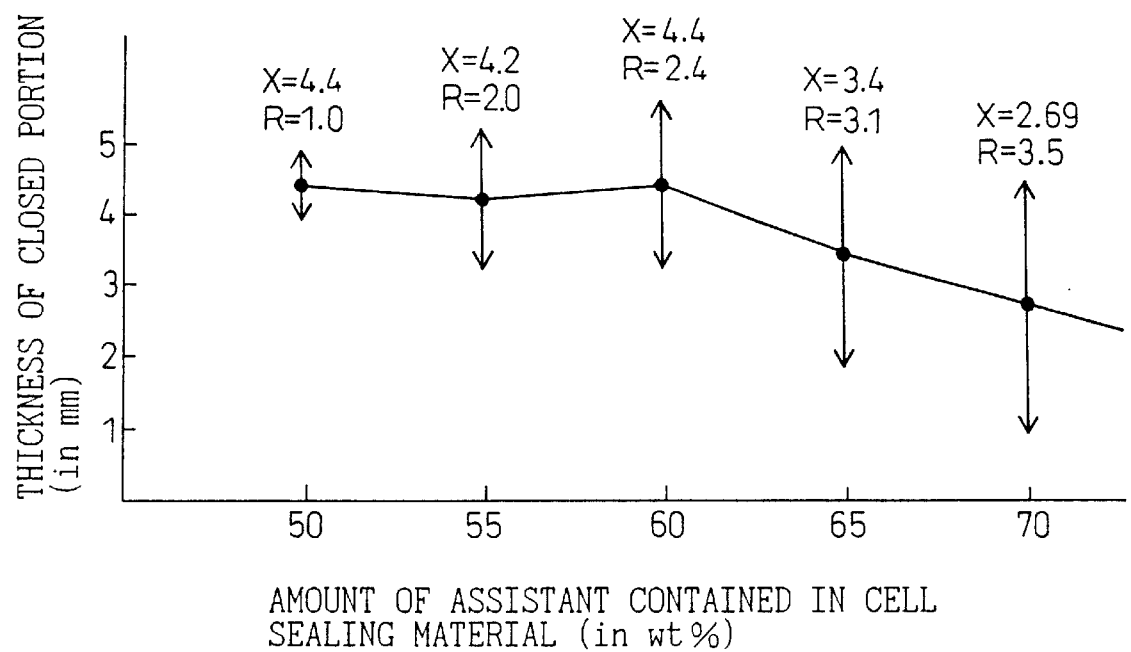

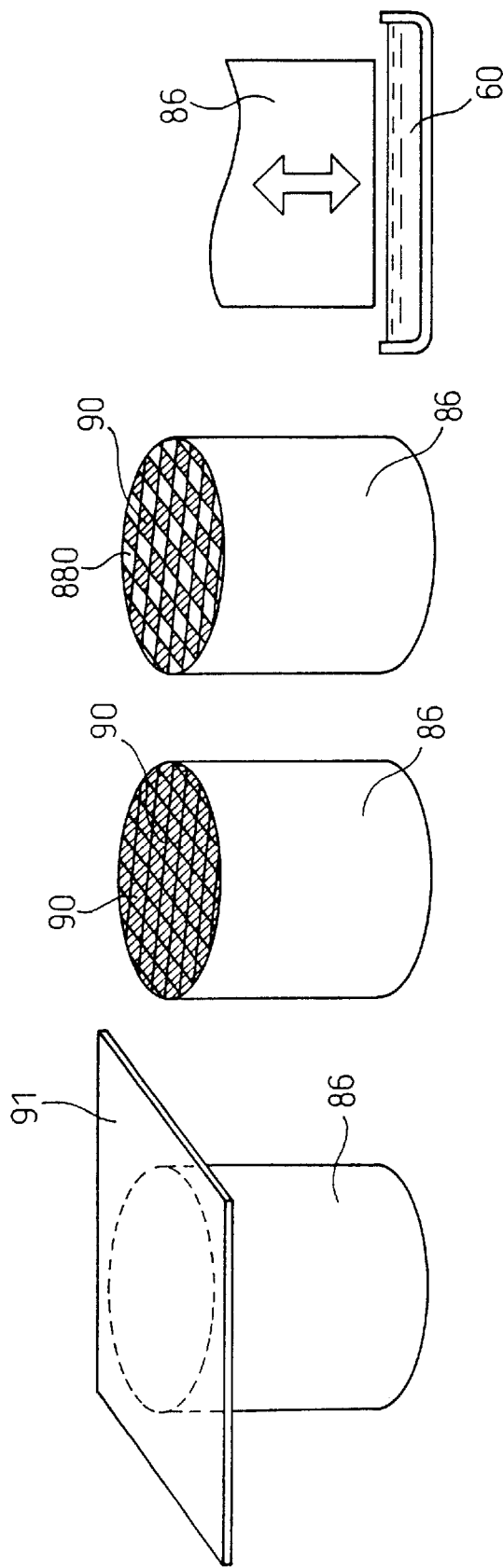

METHOD OF SEALING CELLS OF CERAMIC HONEYCOMB BODY

BACKGROUND OF THE INVENTION

1. Field of the Invention

The present invention relates to a method of sealing the cells of a ceramic honeycomb body, for trapping diesel particulates, and a cell sealing material.

2. Description of the Related Art

As a filter structure for trapping the particulates in the exhaust gas of an automotive vehicle, for example, a ceramic honeycomb structure 8 as shown in FIGS. 5(*a*) and 5(*b*), which comprises a multiplicity of cells 88 defined by a plurality of partitioning walls 81, is available. Alternate ends of a part of the cells 88 are closed by a closing material 830 thereby to make up a plurality of closed portions 83.

In fabricating this ceramic honeycomb structure 8, as disclosed in Japanese Unexamined Patent Publication No. 9-25180, the first step is to mix and knead silicon carbide powder with methylcellulose, making up a binder, water and emulsion stearate, as a lubricant and, using this mixture, fabricate a ceramic honeycomb body with the ends of each cell 88 open. After that, one end of each cell is closed by being filled with a closing material 830.

In closing the cell ends of the ceramic honeycomb body 86, as shown in FIGS. 6(*a*) and 6(*b*), an end surface of the ceramic honeycomb body 86 is covered with a wax sheet 91 of a masking material and pressed thereby to pack the wax 90 into the ends of the cells. Then, as shown in FIG. 6(*c*), the wax 90 to be filled in the cell end portions to be closed is removed manually or by laser thereby to form open cell ends 880.

Then, as shown in FIG. 6(*d*), with the end surface filled with wax facing downward, the honeycomb structure is dipped in a cell sealing material 60 in slurry form, so that the cell sealing material 60 intrudes into the cell ends 880 lacking the wax 90. The cell sealing material used for this purpose is composed of silicon carbide powder to which methylcellulose, making up a binder, water and trimethyl amine, making up a dispersing agent, are added to form a slurry.

After that, the cell sealing material 60 is dried and baked to remove the wax 90. As a result, alternate ones of the cell ends of the ceramic honeycomb body can be sealed.

In the conventional method of sealing the cells of a honeycomb structure as described above, however, the end portion of the ceramic honeycomb structure is sometimes deformed or dissolved when dipped in the cell sealing material.

The present inventor has vigorously studied the cause of the deformation and dissolution of the dipped portion of the ceramic honeycomb structure, and found the following fact.

Specifically, the methylcellulose contained in the ceramic honeycomb structure is water soluble. Therefore, the ceramic honeycomb structure, once it has absorbed water from the cell sealing material, softens and is deformed. When the structure further absorbs water, the methylcellulose making up the binder is dissolved again and the silicon carbide returns to powder and, being unable to hold the shape of the honeycomb, the end portion of the honeycomb is finally dissolved.

SUMMARY OF THE INVENTION

In view of the problems described above, the object of the present invention is to provide a method of sealing the cells of a ceramic honeycomb body and a cell sealing material which can suppress the deformation and dissolution of the portion of a ceramic honeycomb structure dipped in the cell sealing material.

According to a first aspect of the invention, there is provided a method, of sealing the cells of a ceramic honeycomb body, comprising the steps of covering a masking material on the unsealed end surface of the ceramic honeycomb body and dipping a predetermined end surface of the honeycomb structure in a cell sealing material thereby to seal the predetermined end surface of the ceramic honeycomb body, wherein the cell sealing material includes ceramic particles and an assistant for fluidizing the ceramic particles, the assistant having the property of not substantially redissolving the binder contained in the ceramic honeycomb body.

What is most notable of this invention is that an assistant having the property of not dissolving the binder contained in the ceramic honeycomb body is used instead of the water thus far contained in the conventional cell sealing material.

In this aspect of the invention, the assistant is used to give fluidity to the ceramic particles and the binder. This assistant, unlike water, has the property of not dissolving the binder contained in the ceramic honeycomb body. When the ceramic honeycomb body is dipped in the cell sealing material, therefore, the dipped portion is not dissolved in the cell sealing material. As a result, the portion of the ceramic honeycomb body dipped in the cell sealing material can be prevented from being deformed and dissolved.

According to a second aspect of the invention, there is provided a method of sealing the cells of a ceramic honeycomb body in which the assistant is preferably made of at least selected one of a petroleum hydrocarbon, mineral oil, animal or vegetable oil, a higher alcohol and a synthetic oil. In this way, the deformation or dissolution of the dipped portion of the ceramic honeycomb body can be effectively suppressed. These assistants preferably have a high resin solubility, i.e. a low compatibility with water and are recommendably AF Solvent (trade name), for example.

The amount of the assistant contained in the cell sealing material is appropriately selected to make sure that the cell sealing material retains fluidity and the assistant is adsorbed to the wall surface while being dipped in the ceramic honeycomb body so that the cell sealing material is concentrated while being provisionally solidified in the cells of the ceramic honeycomb body.

In the case where AF Solvent (trade name) is used as an assistant, for example, the amount of the assistant contained in the cell sealing material is preferably 50 to 70% by weight. In the case where the content of the assistant is less than 50% by weight, the fluidity of the cell sealing material is so low that the cell end surface may be difficult to seal. In the case where the content of the assistant is more than 70% by weight, on the other hand, the cells may be sealed unevenly.

The ceramic particles contained in the cell sealing material are preferably of the type identical or similar to the ceramic honeycomb body in property. This is to prevent cracking by securing an approximate burning shrinkage ratio and thermal expansion coefficient.

The ceramic particles used for this purpose are composed of a cordierite material, a mullite material, alumina, silicon carbide or silicon nitride.

The cell sealing material may contain a binder. The binder functions to bond the ceramic particles to each other. The binders usable for this purpose include celluloses such as methylcellulose and ethylcellulose, acryl binder and polyvinyl alcohol. Depending on the combination of the material of the ceramic particles and the assistant in the cell sealing material, the binder may be done without. The binder may not be used, for example, in the case where the ceramic particles are composed of a cordierite material and the assistant is AF Solvent.

In the case where an excessive amount of cell sealing material is put in a vessel and the end surface of the ceramic honeycomb body is dipped in the cell sealing material, the cells are not easily sealed by the cell sealing material. The reason is that the ceramic honeycomb body absorbs the assistant not only from the sealed portions but also from the cell sealing material in the vessel, with the result that before the provisional solidification, the assistant absorbed into the ceramic honeycomb body is saturated. Thus, the provisional solidification of the end portion of the ceramic honeycomb body becomes insufficient, and the cell sealing material falls off from the end surface of the ceramic honeycomb body when the latter is taken out of the cell sealing material.

According to a third aspect of the invention, there is provided a method of sealing the cells of the honeycomb body in which, preferably, the cell sealing material is put in a vessel of a sufficient size to accommodate the end surface of the ceramic honeycomb body and the cell sealing material thus charged is of an amount required for one dipping treatment.

The cell sealing material required for one cell sealing treatment is put in the vessel. When the ceramic honeycomb body is mounted in this vessel, the cell sealing material intrudes into the inner wall of the through holes of the mold. The assistant contained in the cell sealing material is absorbed into the ceramic honeycomb body, and the viscosity of the cell sealing material is gradually increased. Before long, the cell sealing material that has intruded into the end portion of the ceramic honeycomb body is provisionally solidified and hardened to such an extent that it will not come off. This method, therefore, can positively seal the end surface of the ceramic honeycomb body.

The amount of the cell sealing material required for one dipping treatment is defined, for example, as an amount larger than the total volume of the sealed portion of the one end surface but smaller than the total volume of the sealed portion of the two end surfaces of the ceramic honeycomb body.

The surface area of the vessel for containing the cell sealing material is preferably as small as possible to the extent that the ceramic honeycomb body can be accommodated and recovered smoothly. This is in order to minimize the amount of the assistant used for one dip session and secure provisional solidification.

In producing the ceramic honeycomb body, ceramic particles are mixed with a binder, water and, when necessary, a lubricant, and after being kneaded, formed into a honeycomb structure using a mold and solidified by being dried.

According to a fourth aspect of the invention, there is provided a cell sealing material for sealing the cells in the end surface of a ceramic honeycomb body, wherein the cell sealing material is configured of ceramic particles and an assistant for fluidizing the ceramic particles, the assistant having such a property as not to substantially redissolve the binder contained in the ceramic honeycomb body.

The cell sealing material according to this aspect of the invention contains, in place of water, an assistant having such a property as not to substantially redissolve the binder contained in the ceramic honeycomb body. The portion of the ceramic honeycomb body dipped in the cell sealing material, therefore, is prevented from being deformed and dissolved.

BRIEF DESCRIPTION OF THE DRAWINGS

FIG. 4 is a diagram showing the relation between the content (weight %) of the assistant contained in the cell sealing material and the thickness (mm) of the sealed cell portions according to a second embodiment of the invention.

FIGS. 6(*a*), 6G, 6*c* and 6(*d*) are diagrams for explaining a method of sealing the cells of a conventional ceramic honeycomb body.

DESCRIPTION OF THE PREFERRED EMBODIMENTS

First Embodiment

Figure 1A:
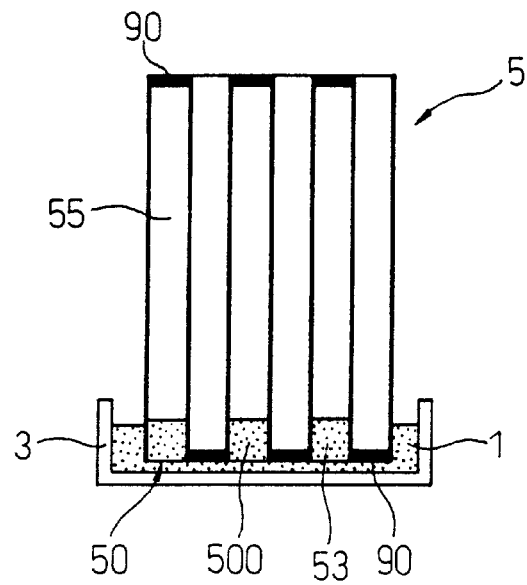
FIGS. 1(*a*) and 1(*b*) are diagrams for explaining a method of sealing the cells of a ceramic honeycomb body according to a first embodiment of the invention.

A method of sealing the cells of a ceramic honeycomb body according to an embodiment of the invention will be explained with reference to FIGS. 1(*a*), 1(*b*), 2 and 3.

This embodiment represents a method of sealing the cells of a ceramic honeycomb body 5 by dipping the end surface thereof in a cell sealing material 1 in a slurry form.

The ceramic honeycomb body 5 with the cells thereof to be sealed is composed of 73% by weight of ceramic particles, 5% by weight of methylcellulose constituting a binder, 19% by weight of water and 3% by weight of synthetic oil as a lubricant, which are mixed into a slurry and formed into a honeycomb and dried. Each of the cells 55 of the ceramic honeycomb body 5 is a square cylinder of 1.2 mm each side and a wall thickness of 0.3 mm. The ceramic honeycomb body 5 as a whole is a cylinder 140 mm in diameter and 130 mm in length. The ceramic particles are composed of a cordierite material, or specifically, a mixture of talc, kaolin and aluminum hydroxide powder.

First, as shown in FIGS. 6(*a*) to 6(*c*), alternate ones of the cells at the end surface 50 of the ceramic honeycomb body are covered with the wax 90. The wax 90 is a masking material. A wax sheet is attached over the whole of the cell end surface 50 of the ceramic honeycomb body, after which only the cell portions to be sealed are irradiated with laser to form apertures 500 while the cell portions not to be sealed are left covered with the wax 90.

As shown in FIG. 1(*a*), the cell sealing material 1 is prepared by mixing 40% by weight of ceramic particles and 60% by weight of assistant for fluidizing the ceramic particles. The ceramic particles used for this purpose are identical to those of the ceramic honeycomb body and AF Solvent (trade name) is used as an assistant.

As shown in FIG. 1(*a*), the cell sealing material 1 is placed in a dish-shaped vessel 3. The vessel 3 is of about the size sufficient to accommodate the end surface 50 of the ceramic honeycomb body 5, and has a margin A of about 3 mm on each side as compared with the diameter of the end surface 50 of the ceramic honeycomb body 5. The amount of the cell sealing material 1 to be charged into the vessel 3 corresponds to one cell sealing treatment. The cell sealing material 1 in liquid form has a depth of 3 mm before the ceramic honeycomb body 5 is dipped.

Figure 2:
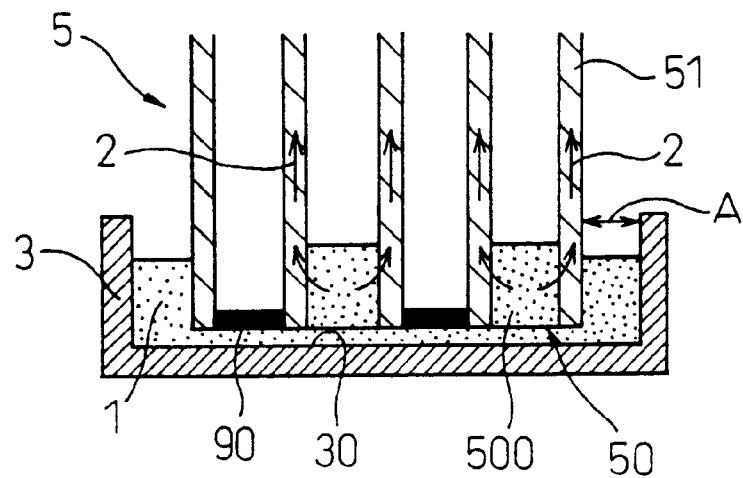
FIG. 2 is a diagram for explaining the ceramic honeycomb body soaked with an assistant in the case where a small amount of a cell sealing material is charged according to the first embodiment.

The ceramic honeycomb body 5 is slowly dipped in the cell sealing material 1 in the vessel 3, and being placed directly on the bottom 30 of the vessel, left to stand. While being left to stand, as shown in FIG. 2, the assistant 2 in the cell sealing material 1 is absorbed into the cell wall 51 of the ceramic honeycomb body 5, so that the viscosity of the cell sealing material increases until finally it is provisionally solidified to form the closed portions 53. The ceramic honeycomb body 5 is left to stand this way for about 2 to 5 minutes before it is provisionally solidified.

Figure 3:
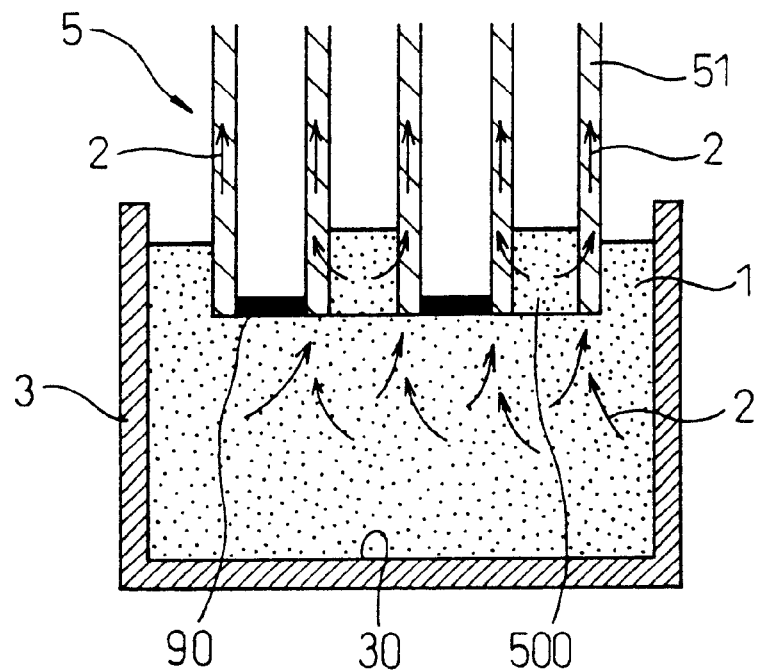
FIG. 3 is a diagram for explaining the ceramic honeycomb body soaked with an assistant in the case where a large amount of a cell sealing material is charged according to the first embodiment.
Figure 5A:
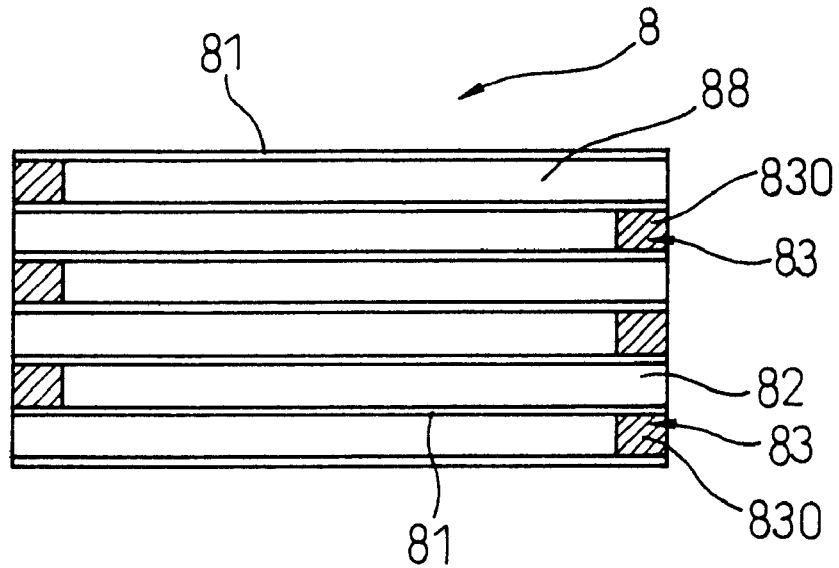
FIGS. 5(*a*) and 5(*b*) are a sectional view and a front view, respectively, of a conventional ceramic honeycomb structure.
Figure 5B:
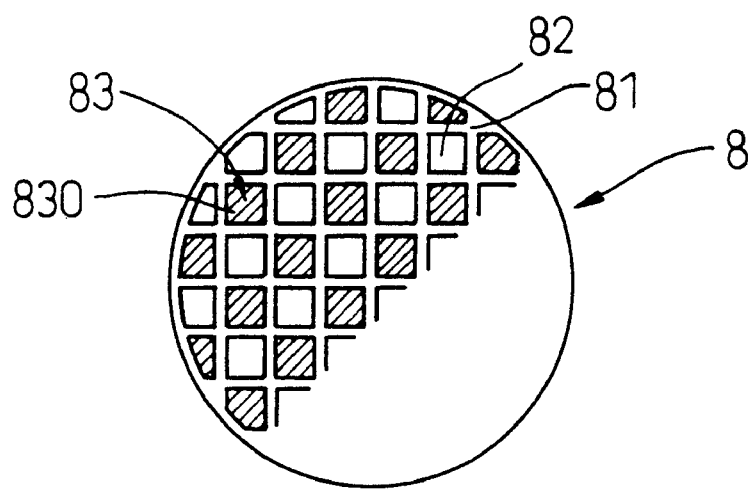

In the case where the cell sealing material 1 is charged in a greater amount to a greater depth for an increased depth of the liquid as shown in FIG. 3 before the ceramic honeycomb body 5 is dipped, the cell sealing material 1 is continuously supplemented from the cell end surface 50 so that the concentration of the closed portion 53 is not increased easily.

Figure 1B:
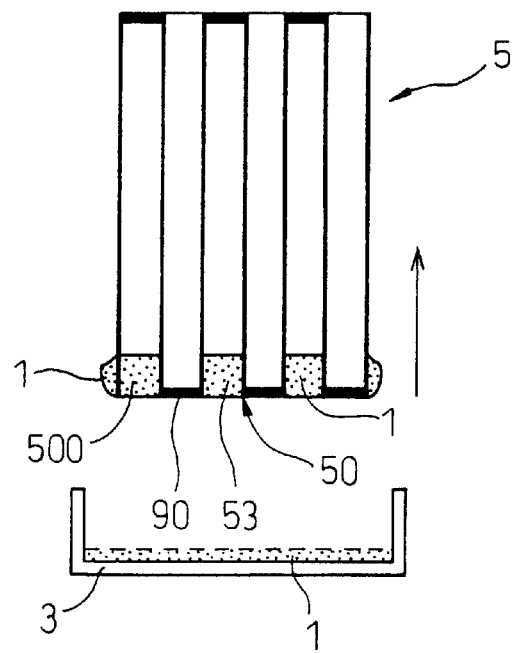

Upon complete provisional solidification, as shown in FIG. 1(b), the ceramic honeycomb body 5 is recovered from the cell sealing material 1 and the extraneous portions of the cell sealing material 1 attached to the wall surface thereof are removed.

In this way, the process for sealing the cells of the ceramic honeycomb body is completed. The same operation is repeated for the other cell end surface.

The observation of the cell end surface of the ceramic honeycomb body thus sealed shows that the sealed cell end portions are not deformed or dissolved but have a uniform thickness.

After that, the ceramic honeycomb body is sintered at 1400° C. The wax 90 making up the masking material thus is burned off, thereby producing a ceramic honeycomb structure of cordierite with alternate ones of the cell ends 50 sealed.

The ceramic honeycomb structure thus produced is mounted as a diesel particulate filter midway in the exhaust pipe of the diesel engine of an automobile.

Second Embodiment

In this embodiment, the amount of the assistant to be contained in the cell sealing material is determined.

The same kind of ceramic particles and binder in the same ratio as in the first embodiment are used for the cell sealing material. The concentration of the assistant in the cell sealing material is varied between 50 and 70% by weight. AF Solvent is used as an assistant. Using this cell sealing material, the cells of the ceramic honeycomb body are sealed in the same manner as in the first embodiment. Four ceramic honeycomb bodies are sealed for the respective concentrations of the assistant, and the thicknesses of the sealed portions are measured as shown in FIG. 4.

In FIG. 4, the abscissa represents the amount (weight %) of the assistant contained in the cell sealing material, and the ordinate the thickness (mm) of the seal. Character R designates the variations of the cell seal thickness, and character X the average value thereof. This graph shows that the larger the amount of the assistant contained, the smaller the cell seal thickness.

This is by reason of the fact that, in the case where the amount of the assistant is small, the amount of the assistant absorbed into the ceramic honeycomb body 5 is limited so that the cells can be sealed to substantially the same thickness as the thickness of the sealing material attached in the initial stage of the period during which the ceramic honeycomb body is left to stand. With the increase in the amount of the assistant contained in the cell sealing material, a greater amount of the assistant is absorbed into the ceramic honeycomb body, and therefore a smaller amount of the cell sealing material is left at the cell end portions provisionally solidified. Another reason may be that an increased amount of the assistant decreases the viscosity of the cell sealing material. Thus, as soon as the ceramic honeycomb body is placed in the cell sealing material, the cell sealing material escapes out of the ceramic honeycomb body, thereby decreasing the amount of the cell sealing material entering the cells in direct contact therewith.

It is also seen that the variations of the cell seal thickness are small for an assistant concentration in the range of 50 to 55% by weight, while the variations (R) of the cell seal thickness increase for an assistant concentration of more than 55% by weight.

What is claimed is:

1. A method of sealing cells at a predetermined part of an end surface of a ceramic honeycomb body, comprising the steps of:

placing a masking material on those portions of an end surface of the cells of the ceramic honeycomb body which are not sealed; and dipping said end surface of said ceramic honeycomb body in a cell sealing material to thereby seal predetermined cell portions of the end surface of said ceramic honeycomb body;

wherein said cell sealing material is composed of ceramic particles and an assistant for fluidizing said ceramic particles, said assistant having a property of not substantially redissolving a binder contained in said ceramic honeycomb body.

2. A method of sealing the cells of a ceramic honeycomb body according to claim 1, wherein said assistant is composed of at least a selected one of a petroleum hydrocarbon, mineral oil, animal or vegetable oil, a higher alcohol and a synthetic oil.

3. A method of sealing the cells of a ceramic honeycomb body according to claim 1, wherein said cell sealing material is placed in a vessel large enough to accommodate the end surface of said ceramic honeycomb body, and said cell sealing material is charged into said vessel in an amount required for one dipping treatment.

* * * * *